(12) United States Patent  (10) Patent No.: US 6,406,007 B1
Wilson  (45) Date of Patent: Jun. 18, 2002

(54) LEAF SPRING ASSEMBLY HAVING FULL-LEAF LEAF SPRING COMPONENT AND HALF-LEAF LEAF SPRING COMPONENT

(75) Inventor: William Wilson, Downers Grove, IL (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/522,585

(22) Filed: Mar. 10, 2000

(51) Int. Cl.$^7$ ................................................ B60G 11/46
(52) U.S. Cl. ........................ 267/36.1; 267/283; 267/41; 280/124.17; 280/124.163
(58) Field of Search ........................... 267/36.1, 41, 47, 267/229, 259, 283; 280/124.163, 124.17

(56) References Cited

U.S. PATENT DOCUMENTS

| | | | | | |
|---|---|---|---|---|---|
| 103,041 | A | * | 5/1870 | Goller | |
| 156,122 | A | * | 10/1874 | Bidwell | |
| 1,229,109 | A | * | 6/1917 | McIntyre | |
| 1,557,237 | A | * | 10/1925 | Bobo | |
| 1,747,727 | A | * | 2/1930 | Monteith | |
| 1,824,295 | A | * | 9/1931 | Pohl et al. | |
| 2,815,945 | A | * | 12/1957 | Green | 267/45 |
| 3,062,526 | A | * | 11/1962 | Roehrig | 267/48 |
| 3,168,300 | A | * | 2/1965 | Giovinazzo | 267/48 |
| 3,434,707 | A | * | 3/1969 | Raidel | 267/31 |
| 3,674,249 | A | * | 7/1972 | McGee | 267/52 |
| 3,802,718 | A | * | 4/1974 | Schaeff | 280/124 F |
| 4,178,015 | A | * | 12/1979 | Merriman et al. | 280/711 |
| 4,802,659 | A | * | 2/1989 | Hope | 267/149 |
| 4,919,399 | A | * | 4/1990 | Selzer et al. | 267/31 |
| 5,123,672 | A | * | 6/1992 | Walton et al. | 280/772 |
| 5,938,221 | A | * | 8/1999 | Wilson | 267/260 |
| 6,158,773 | A | * | 12/2000 | Verhaeghe | 280/787 |

FOREIGN PATENT DOCUMENTS

| | | | |
|---|---|---|---|
| EP | 0473214 A1 | * | 3/1992 |
| EP | 0551612 A1 | * | 7/1993 |
| GB | 1348582 | | 3/1974 |

* cited by examiner

*Primary Examiner*—Paul N. Dickson
*Assistant Examiner*—Melody M. Burch
(74) *Attorney, Agent, or Firm*—Cook, Alex, McFarron, Manzo, Cummings & Mehler, Ltd.

(57) ABSTRACT

A leaf spring assembly for use as an active component in vehicle suspension systems includes a full-leaf leaf spring component and a half-leaf leaf spring component connected thereto. The full-leaf leaf spring extends substantially the entire length of the leaf spring assembly and the half-leaf leaf spring extends substantially the entire length of one of the cantilevers. In a preferred form, when the leaf spring assembly has front and rear cantilevers of substantially unequal length, the leaf spring assembly provides for a constant caster angle for its associated axle during deflection of the assembly due to jounce and rebound. In another preferred form, when the leaf spring assembly has front and rear cantilevers of substantially equal length, the leaf spring assembly provides for a varying caster angle for its associated axle during deflection of the assembly due to jounce and rebound. In yet another preferred form, the axle seat portion of the full-leaf leaf spring is designed such that it biases the position of the axle associated with the leaf spring assembly to a predetermined caster angle.

6 Claims, 5 Drawing Sheets

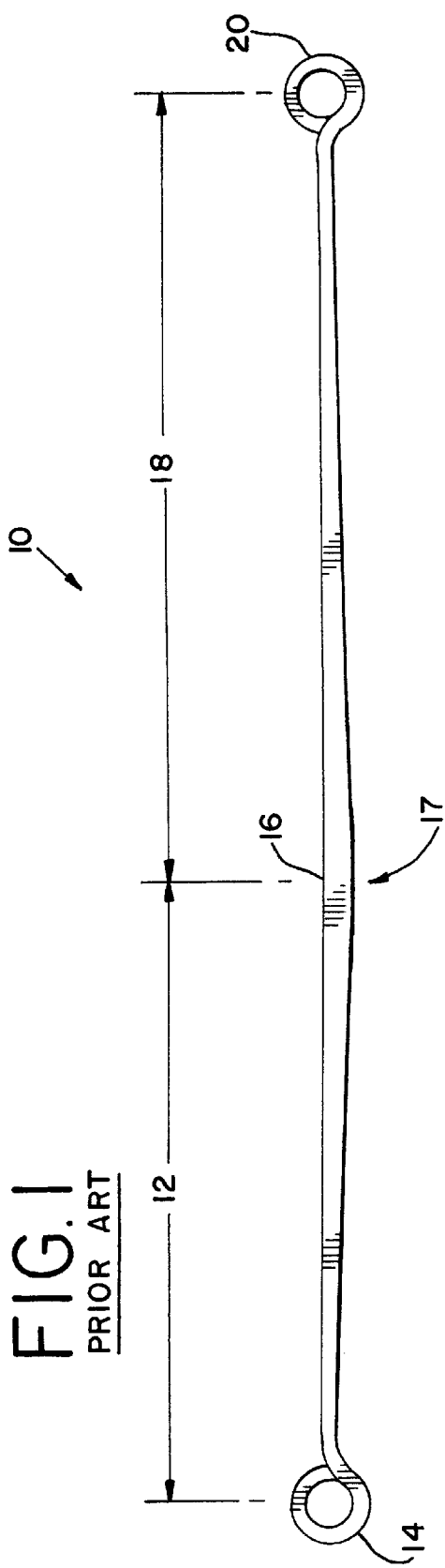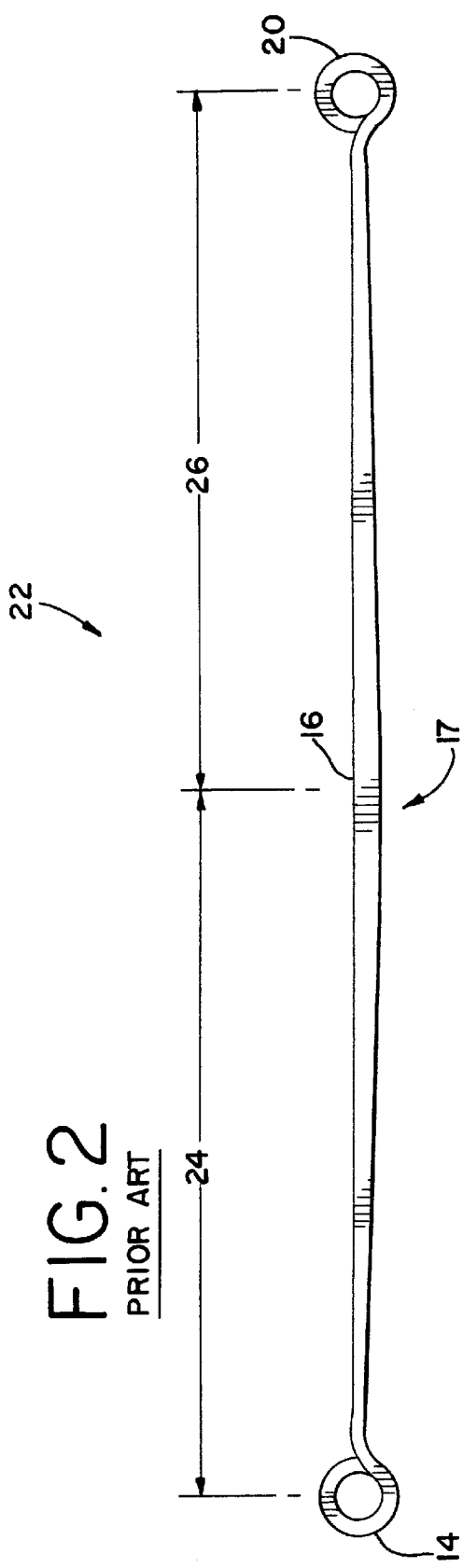

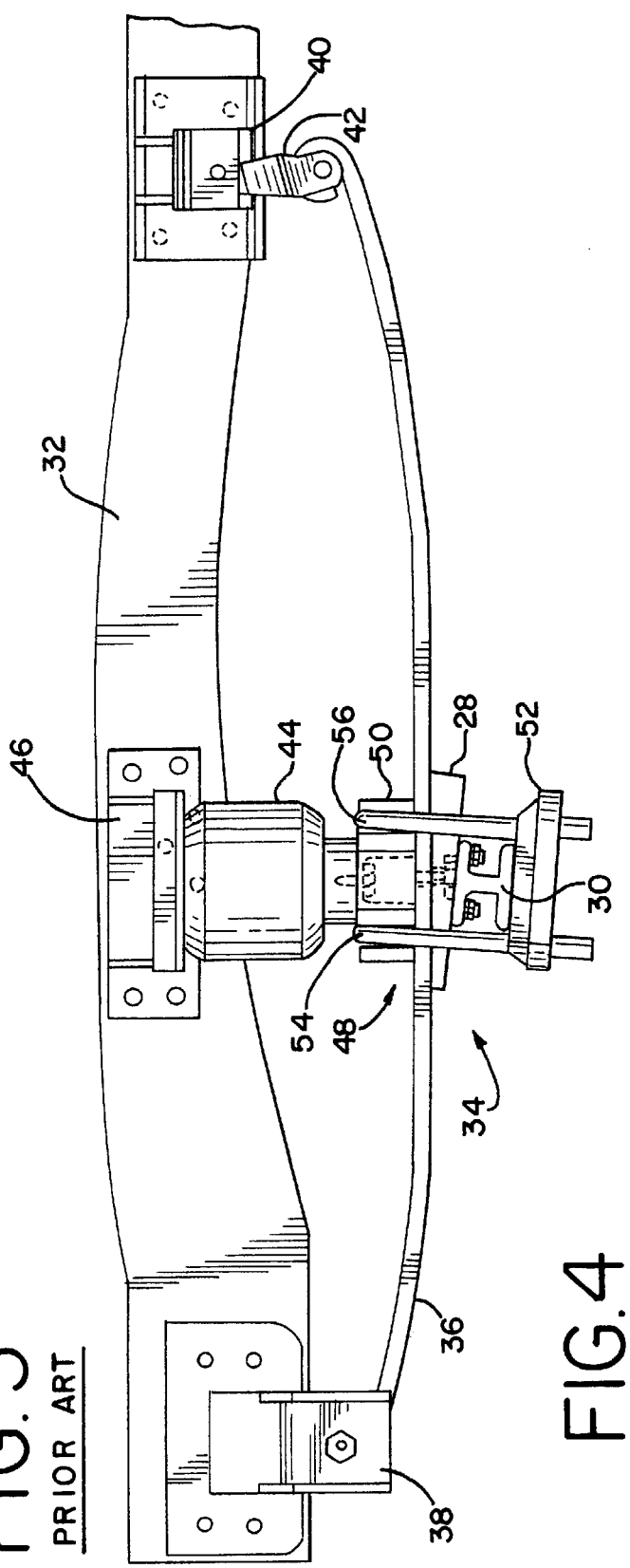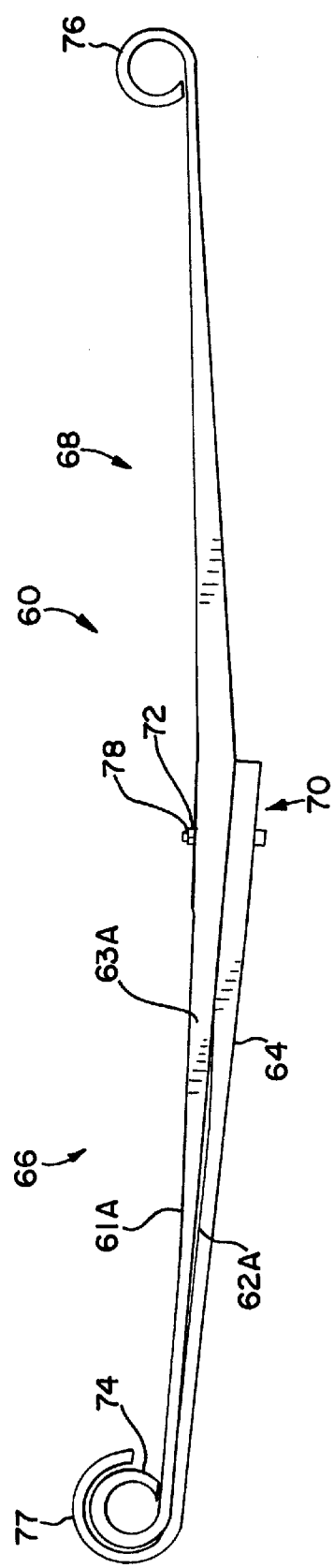
FIG. 3 PRIOR ART
FIG. 4

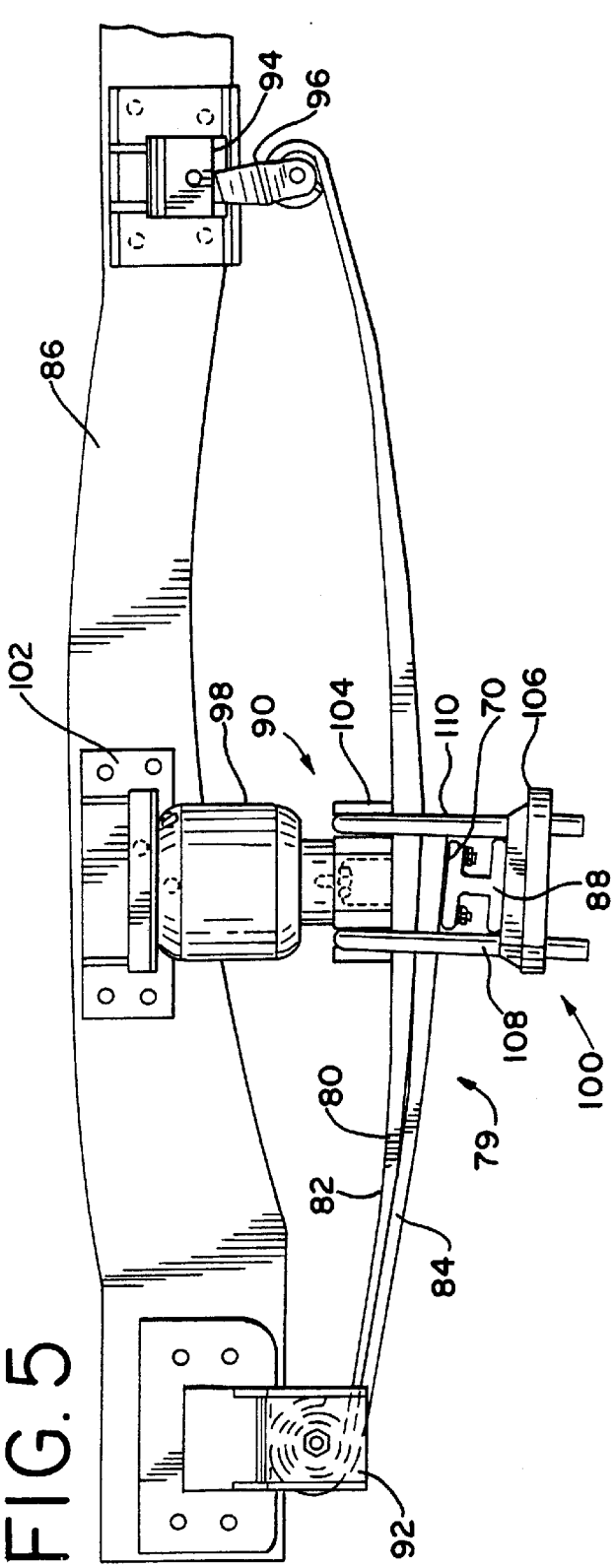

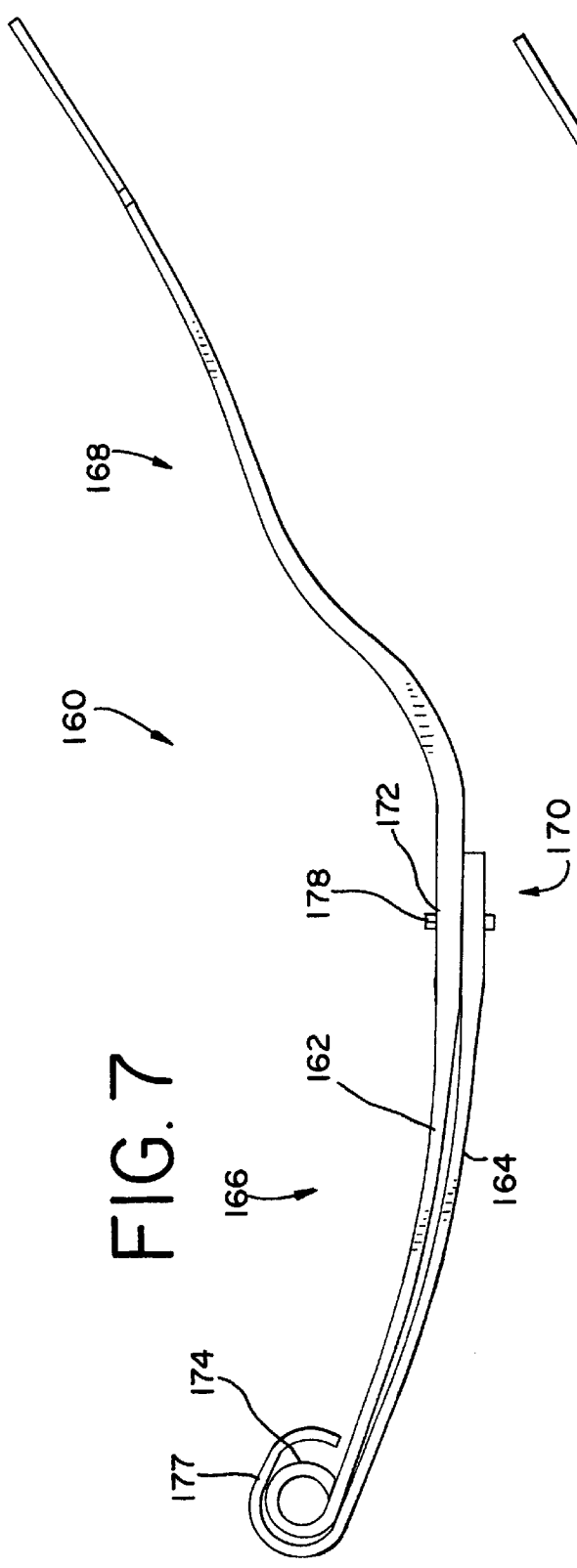

LEAF SPRING ASSEMBLY HAVING FULL-LEAF LEAF SPRING COMPONENT AND HALF-LEAF LEAF SPRING COMPONENT

BACKGROUND OF THE INVENTION

The present invention relates generally to active components for suspension systems, and more particularly, to springs for such systems.

A basic object of any suspension system in a vehicle is to suspend the vehicle body above the vehicle wheels. To achieve this end, suspension systems are typically connected between the axle, or its housing, and the vehicle frame. Suspension systems typically include active components, such as springs and the like, to keep the sprung mass (vehicle body) suspended above the unsprung mass (vehicle wheels). A suspension system preferably permits a relatively smooth, yet stable, ride during acceleration, deceleration and cornering of the vehicle, and during jounce and rebound of the axle when the vehicle is driven over bumpy surfaces and the like.

In suspension systems, leaf springs often serve as the active components. In a variety of circumstances, concerns regarding vehicle packaging necessitate the use of an asymmetrical leaf spring. In asymmetrical leaf springs, one cantilever of the leaf spring is longer than the other cantilever. For instance, and referring to FIG. 1, in a typical asymmetrical leaf spring 10, the front cantilever 12 (i.e., that portion of the leaf spring extending from one end 14 of the leaf spring to the center 16 of the axle seat portion 17) might be longer than the rear cantilever 18 (i.e., that portion of the leaf spring extending from the center 16 of the axle seat portion 17 to the opposite end of the leaf spring 20). This difference in length between cantilevers is what classifies a leaf spring as asymmetrical.

Ordinarily, leaf springs in general, including asymmetrical leaf springs, are designed such that they have the same stress level in each cantilever. In the case of asymmetrical leaf springs, this optimized design results in the shorter cantilever being stiffer than the longer cantilever. Stated differently, the shorter cantilever has a higher spring rate than the longer cantilever. Conversely, the longer cantilever is softer than the shorter cantilever, and it has a lower spring rate. Given this optimized design, during deflection of the leaf spring (e.g., during jounce and rebound of the vehicle axle), the seat portion 16 of the spring translates vertically and rotates due to the differing spring rates of the respective cantilevers. This rotation of the seat portion, in turn, applies torsion to the axle and causes it to rotate, producing a varying caster angle during vehicle movement. Those skilled in the art understand that this varying caster angle is sometimes undesirable, and can serve as a drawback designed for optimum stress tolerances. Nevertheless, vehicle packaging concerns and the like often necessitate use of such asymmetrical leaf springs.

In light of these deficiencies of stress tolerant asymmetrical leaf springs, it is desirable to design an asymmetrical leaf spring that has cantilevers with substantially equal spring rates so that the axle has constant caster during jounce and rebound.

When packaging concerns are not present, it is often desirable to use symmetrical leaf springs, such as the symmetrical leaf spring 22 shown in FIG. 2. In such springs, the front and rear cantilevers 24, 26 are substantially equal in length. When optimized for maximum stress tolerance, the cantilevers not only have equal stress levels, but also have equal spring rates to yield the equal stress levels. In such leaf springs, the seat portion does not rotate during spring deflection and the axle associated with the spring maintains a constant caster angle during jounce and rebound.

Although constant caster is often desirable, in some instances varying caster is optimal. Those skilled in the art will recognize that in trailing arm suspensions varying caster is often desirable in those instances when the axle, or its housing, is generally resistant to torsion. In those cases, by varying the caster angle of the axle during jounce and rebound, roll stability for the vehicle is increased. Therefore, the use of auxiliary roll stabilizers might be unnecessary. Elimination thereof reduces the cost and weight associated with those suspension systems.

In light of the aforementioned deficiencies of stress tolerant symmetrical leaf springs, it is desirable to design a symmetrical leaf spring that has cantilevers with substantially different spring rates so that the axle has varying caster during jounce and rebound.

As will be appreciated by those skilled in the art, vehicles often optimally have a biased, fixed caster for each of its axles. Different axles often have different desirable biased, fixed caster angles. In conventional suspension systems, and referring to FIG. 3, a caster wedge 28 is often positioned between the axle seat of the leaf spring and the axle to provide for the selected, fixed caster angle of the axle.

FIG. 3 illustrates a conventional suspension system used for a front steering axle 30. As shown therein, a vehicle frame 32 extends longitudinally and is suspended above axle 30 by a suspension system generally identified by reference numeral 34. The suspension system 34 includes a leaf spring 36 pivotally connected at one end to a hanger 38, which, in turn is fixedly mounted to frame 32. At its other end, leaf spring 36 is pivotally connected to a hanger 40 through a conventional shackle 42. Hanger 40 is mounted to frame 32. An air spring 44 is optionally mounted at its top side to an air spring mounting bracket 46, which is fixedly mounted to frame 32. Air spring 44 is seated on an axle attachment assembly 48 in alignment with axle 30. The axle attachment assembly 48 includes a pair of guide plates 50, 52 positioned on opposite sides of axle 30, the caster wedge 28, and a pair of U-bolts 54, 56 to fasten the assembly components together.

Caster wedge 28 causes axle 30 to rotate a fixed amount of degrees (either clockwise or counter-clockwise, depending on the orientation of the caster wedge) to accommodate the desired fixed caster angle for the axle. Use of extra suspension system components, such as caster wedge 28, adds weight to the suspension system and increases the costs associated with the design, assembly and service of such systems.

In light of the foregoing, it is desirable to design suspension system components, particularly leaf springs, that provide for the desired fixed caster angle of a vehicle axle.

As an object of the present invention, it is desirable to produce an optimally designed asymmetrical leaf spring that maintains a constant caster angle for its associated axle during jounce and rebound.

As another object, it is desirable to produce an optimally designed symmetrical leaf spring that produces a varying caster angle for its associated axle during jounce and rebound.

It is also desirable to reduce the expense associated with suspension systems used in vehicles.

It is further desirable to eliminate the necessity of including additional components in such suspension systems.

It is yet further desirable to design a leaf spring having built-in features to produce a select biased caster angle for its associated axle.

These and other objects of the preferred forms of the invention will become apparent from the following description. It will be understood, however, that an apparatus could still appropriate the invention claimed herein without accomplishing each and every one of these objects, including those gleaned from the following description. The appended claims, not the objects, define the subject matter of this invention. Any and all objects are derived from the preferred forms of the invention, not necessarily the invention in general.

SUMMARY OF THE INVENTION

The present invention is directed to a leaf spring assembly for use as an active component in vehicle suspension systems. The leaf spring assembly includes a full-leaf leaf spring component and a half-leaf leaf spring component. The full-leaf leaf spring extends substantially the entire length of the leaf spring assembly and the half-leaf leaf spring extends substantially the entire length of one of the cantilevers. The half-leaf leaf spring preferably also extends along the axle seat portion of the other cantilever and terminates at the end of the axle seat portion included within the other cantilever. The full-leaf leaf spring and the half-leaf leaf spring are preferably connected together by a fastener.

In a preferred form, when the leaf spring assembly has front and rear cantilevers of substantially unequal length, the half-leaf leaf spring extends substantially along the entire length of the shorter cantilever to soften that cantilever. Under such circumstances, the leaf spring assembly preferably has relatively uniform stress tolerance provides for a constant caster angle for its associated axle during deflection of the assembly due to jounce and rebound.

In another preferred form, when the leaf spring assembly has front and rear cantilevers of substantially equal length, the half-leaf leaf spring softens the cantilever along which it extends. Under these circumstances, the leaf spring assembly preferably has relatively uniform stress tolerance and provides for a varying caster angle for its associated axle during deflection of the assembly due to jounce and rebound.

In yet another preferred form, the axle seat portion of the full-leaf leaf spring is designed such that it biases the position of the axle associated with the leaf spring assembly to a predetermined caster angle. In that regard, one of the upper and lower surfaces of the full-leaf leaf spring, most preferably the lower surface, tapers throughout the axle seat portion in such a manner that the full-leaf leaf spring is thicker at one end of its axle seat portion than it is at the other end of its axle seat portion. In particular, throughout the axle seat portion, the upper and lower surfaces of the full-leaf leaf spring extend in the intersecting planes. As such, the full-leaf leaf spring, and therefore the leaf spring assembly, includes a built-in caster wedge that biases its associated axle to a predetermined caster angle.

BRIEF DESCRIPTION OF THE DRAWINGS

In the following detailed description, reference will frequently be made to the following drawings, in which like reference numerals refer to like components, and in which:

FIG. 1 is a side view of a conventional asymmetrical single leaf leaf spring;

FIG. 2 is a side view of a conventional symmetrical single leaf leaf spring;

FIG. 3 is a side view of a conventional suspension system incorporating a caster wedge;

FIG. 4 is a side view of a first preferred form of a leaf spring assembly constructed in accordance with the principles of the present invention;

FIG. 5 is a side view of a conventional suspension system incorporating the leaf spring assembly shown in FIG. 4;

FIG. 6 is a side view of a second preferred form of a leaf spring assembly constructed in accordance with the principles of the present invention;

FIG. 7 is a side view of a third preferred form of a leaf spring assembly constructed in accordance with the principles of the present invention;

FIG. 8 is a side view of a fourth preferred form of a leaf spring assembly constructed in accordance with the principles of the present invention.

DETAILED DESCRIPTION OF THE PREFERRED EMBODIMENTS

Figure 9:
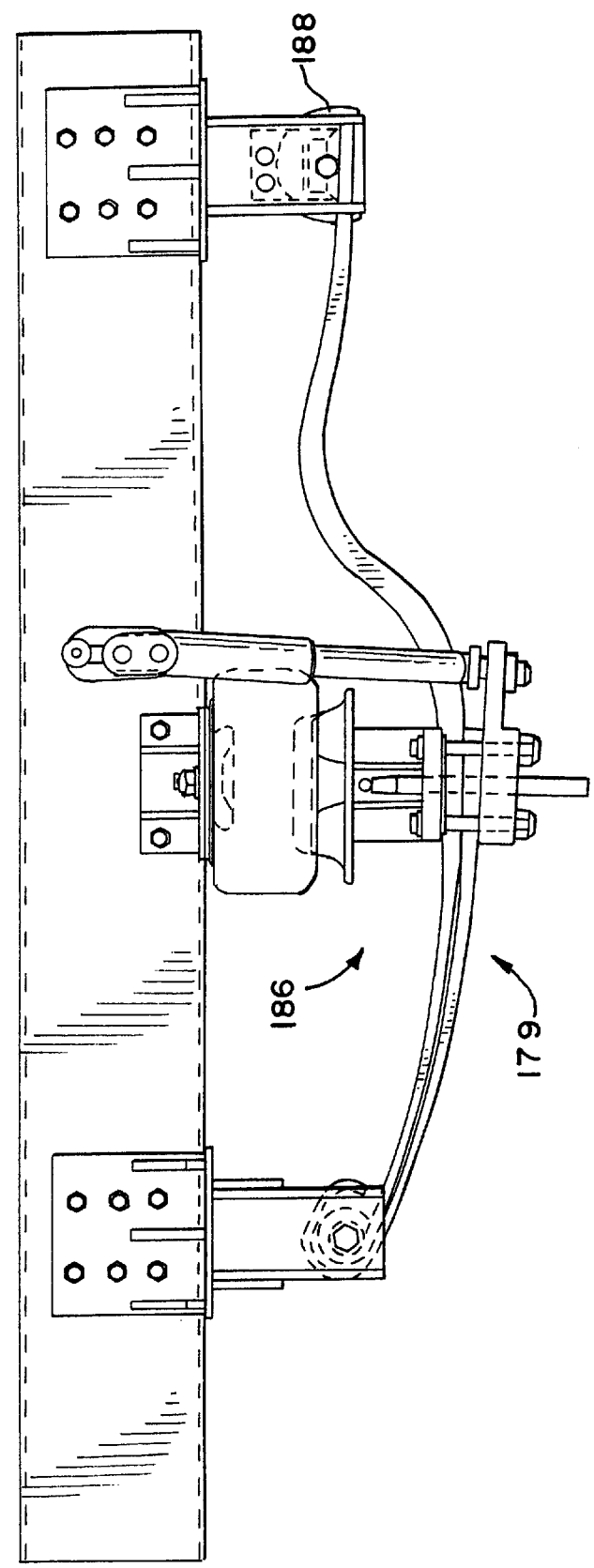
FIG. 9 is a side view of a suspension system incorporating the leaf spring assembly shown in FIG. 8.

FIGS. 4 and 6 illustrate a leaf spring assembly 60 having a full-leaf leaf spring component 63A (in FIG. 4), 63B (in FIG. 6) and half-leaf leaf spring component 64. The leaf spring assembly is divided into a front cantilever portion 66 and a rear cantilever portion 68. An axle seat portion 70 extends through a midsection of leaf spring assembly 60. Axle seat portion 70 has a centerpoint 72, which is preferably in line with the lateral boundary that divides front cantilever portion 66 and rear cantilever portion 68. In this arrangement, part of axle seat portion 70 is in front cantilever 66 and part of the axle seat portion is in rear cantilever 68.

The full-leaf leaf spring component 63A (FIG. 4), 63B (FIG. 6) has an upper surface 61A (FIG. 4), 61B (FIG. 6) and a lower surface 62A (FIG. 4), 62B (FIG. 6). In FIG. 4, the distance between upper surface 61A and lower surface 62A through axle seat portion 70 is not uniform. In particular, lower surface 62A tapers as it extends through axle portion 70 and, in effect, establishes a built-in caster angle feature for the leaf spring assembly 60 shown in FIG. 4. On the other hand, in FIG. 6, the distance between upper surface 61B and lower surface 62B through axle seat portion 70 is uniform so that the leaf spring assembly 60 shown in FIG. 6 has no built-in caster angle feature.

The full-leaf leaf spring component 62 includes eyes 74, 76 at opposite ends thereof. Eyes 74, 76 are used for attachment to hangers, shackles or similar structures in vehicle suspension systems (see FIG. 5). The half-leaf leaf spring component 64 includes a wrap 77 at its front end. Wrap 77 provides an additional safety feature to keep the connection intact even under the unlikely condition wherein eye 74 breaks. Half-leaf leaf spring component 64 preferably extends along the substantial entire length of front cantilever 66 and through the axle seat portion 70, preferably terminating at the end of the axle seat portion within rear cantilever 68. Full-leaf leaf spring component 62 and half-leaf leaf spring component 64 are fastened together by a fastener 78, preferably positioned so that it is aligned with the centerpoint 72 of axle seat portion 70.

It will be understood by those skilled in the art that this unique construction of leaf spring assembly 60 permits an asymmetrical leaf spring designed for maximum stress tolerance to function as a conventional symmetrical leaf spring likewise designed for maximum stress tolerance. In particular, the half-leaf leaf spring component 64 softens the cantilever through which it extends (front cantilever 66 in FIG. 4), giving it a lower spring rate. Under these circumstances, the design of leaf spring assembly 60 can be optimized so that, when assembled in a suspension system, the axle associated with the leaf spring maintains a constant caster angle during deflection of the leaf spring due to jounce and rebound.

When it is symmetrical, however, the leaf spring can function as a conventional asymmetrical leaf spring. Again, the half-leaf leaf spring component 64 softens the cantilever through which it extends (front cantilever 66 in FIG. 4), giving it a lower spring rate. Under these circumstances, the design of leaf spring assembly 60 can be optimized so that, when assembled in a suspension system, the caster angle of the associated axle is changed throughout its jounce and rebound movement.

Referring now to FIG. 5, the leaf spring assembly 79 shown therein is designed like the one shown in FIG. 4. Accordingly, it includes a full-leaf leaf spring component 80 having an upper surface 82 and a lower surface 84. The distance between upper surface 82 and lower surface 84 at any given point of full-leaf leaf spring component 80 defines the thickness of the component at that given point. For the leaf spring assembly 79 shown in FIG. 5, through its axle seat portion 70, the upper surface 82 and lower surface 84 of full-leaf leaf spring component 80 extend in nonparallel (i.e., intersecting) planes. In the embodiment shown, upper surface 82 extends substantially flat through axle seat portion 70, while lower surface 84 linearly tapers in a manner such that the full-leaf leaf spring component 80 is thicker at the rear end of the axle seat portion than it is at the front end of the axle seat portion. As a result of this construction, when assembled, leaf spring assembly 79 biases its associated axle so that it is positioned at a predetermined caster angle. In effect, the portion of full-leaf leaf spring component 80 extending through axle seat portion 70 serves as a built-in caster wedge for leaf spring assembly 79.

FIG. 5 illustrates the use of leaf spring assembly 79 in a suspension system. A longitudinally extending vehicle frame 86 is suspended above an axle 88 by a vehicle suspension system generally designated by reference numeral 90. The suspension system includes leaf spring assembly 79, which is pivotally connected at its proximal end to a hanger 92, which, in turn, is fixedly mounted to frame 86. Leaf spring assembly 79 is also connected at its distal end to a hanger 94 through a conventional shackle 96, which permits movement of the distal end of the leaf spring assembly. Hanger 94 is fixedly mounted to frame 86.

An air spring 98 is mounted atop an axle attachment assembly 100. The air spring is mounted to frame 86 by an air spring mounting bracket 102.

Leaf spring attachment assembly includes an upper guide plate 104, a lower guide plate 106 and two U-bolts 108, 110. The U-bolts 108, 110 are used to fasten the leaf spring assembly 79 to the axle 88. Using the leaf spring assembly shown in FIG. 4 biases axle 88 in a position wherein it has a predetermined biased caster angle. If leaf spring assembly 79 functions like a symmetrical leaf spring, then the biased caster angle remains constant during jounce and rebound. If leaf spring assembly 79 functions like an asymmetrical leaf spring, then the biased caster angle will vary during jounce and rebound. As explained above, the unique design of leaf spring assembly 79 permits it to establish a predetermined biased caster angle for its associated axle, and permits varying spring rates in the cantilevers of the leaf spring assembly.

FIG. 7 illustrates a leaf spring assembly 160 having a full-leaf leaf spring component 162 and a half-leaf leaf spring component 164. The leaf spring assembly 160 is in a form similar to a tapered convolute leaf spring, which serves the subject matter for U.S. Pat. No. 5,938,221, issued to Wilson, the disclosure of which is hereby incorporated herein by reference. The leaf spring assembly 160 is divided into a front cantilever portion 166 and a rear cantilever portion 168. An axle seat portion 170 extends through a midsection of leaf spring assembly 160. Axle seat 170 has a centerpoint 172, which is preferably in line with the lateral boundary that divides front cantilever portion 166 and rear cantilever portion 168. In this arrangement, part of axle seat portion 170 is in front cantilever 166 and part of the axle seat portion is in rear cantilever 168.

The full-leaf leaf spring component 162 includes an eye 174 at one of its ends. Eye 174 is used for attachment to hangers, shackles or similar structures in vehicle suspension systems (see FIG. 9). The half-leaf leaf spring component 164 includes a wrap 177 at the same end as eye 174. Wrap 177 provides an additional safety feature to keep the connection intact even under the unlikely condition wherein eye 174 breaks. Half-leaf leaf spring component 164 preferably extends along the substantial entire length of front cantilever 166 and through the axle seat portion 170, preferably terminating at the end of the axle seat portion within rear cantilever 168. Full-leaf leaf spring component 162 and half-leaf leaf spring component 164 are fastened together by a fastener 178, preferably positioned so that it is aligned with the centerpoint of axle seat portion 170.

It will be understood by those skilled in the art that this unique construction of leaf spring assembly 160 permits an asymmetrical leaf spring designed for maximum stress tolerance to function as a conventional symmetrical leaf spring likewise designed for maximum stress tolerance. In particular, the half-leaf leaf spring component 164 softens the cantilever through which it extends (front cantilever 166 in FIG. 7), giving it a lower spring rate. Under these circumstances, the design of leaf spring assembly 160 can be optimized so that, when assembled in a suspension system, the axle associated with the leaf spring maintains a constant caster angle during deflection of the leaf spring due to jounce and rebound.

When it is symmetrical, however, the leaf spring can function as a conventional asymmetrical leaf spring. Again, the half-leaf leaf spring component 164 softens the cantilever through which it extends (front cantilever 166 in FIG. 4), giving it a lower spring rate. Under these circumstances, the design of leaf spring assembly 160 can be optimized so that, when assembled in a suspension system, the caster angle of the associated axle is changes throughout its jounce and rebound movement.

Referring now to FIG. 8, the leaf spring assembly 179 shown therein includes a full-leaf leaf spring component 180 having an upper surface 182 and lower surface 184. The distance between upper surface 182 and lower surface 184 at any given point of full-leaf leaf spring component 180 defines the thickness of the component at that given point. For the leaf spring assembly 179 shown in FIG. 8, through its axle seat portion 170, the upper surface 182 and lower surface 184 of full-leaf leaf spring component 180 extend in nonparallel (i.e., intersecting) planes. In the embodiment shown, upper surface 182 extends substantially flat through axle seat portion 170, while lower surface 184 linearly tapers in a manner such that full-leaf leaf spring component 180 is thicker at the rear end of the axle seat portion than it is at the front end of the axle seat portion. As a result of this construction, when assembled, leaf spring assembly 179 biases its associated axle so that it is positioned at a predetermined caster angle. In effect, the portion of full-leaf leaf spring component 180 extending through axle seat portion 170 serves as a built-in caster wedge for leaf spring assembly 179.

FIG. 9 illustrates the leaf spring assembly 179 shown in FIG. 8, as incorporated in a suspension system 186. For reference to the suspension system 186, reference will be made to the aforementioned U.S. Pat. No. 5,938,221. It will be noted that the distal end of leaf spring assembly 179 is connected to its associated frame hanger via an attachment member 188, which is further disclosed in U.S. Pat. No. 5,887,881, issued to Hatch, the disclosure of which is hereby incorporated herein by reference. In lieu of attachment member 188, a different attachment member could be used, preferably one constructed in accordance with the principles of the invention disclosed in U.S. Ser. No. 09/040,570 (Dudding), filed Mar. 18, 1998, the disclosure of which is hereby incorporated herein by reference.

While this invention has been described with reference to an illustrative embodiment, it will be understood that this description shall not be construed in a limiting sense. Rather, various changes and modifications can be made to the illustrative embodiment without departing from the true spirit and scope of the invention, as defined by the following claims. Furthermore, it will be appreciated that any such changes and modifications would be recognized by those skilled in the art as an equivalent to one element or more of the following claims, and shall be covered by such claims to the fullest extent permitted by law.

What is claimed is:

1. A leaf spring assembly for use as an active component in vehicle suspension systems, comprising:
    a first cantilever portion;
    a second cantilever portion adjacent to said first cantilever portion;
    a first leaf spring component having a frame hanger and shackle attachment portion and a full-leaf leaf portion extending substantially along said first and second cantilever portions;
    a second leaf spring component connected to said first leaf spring component and having a frame hanger and shackle attachment portion positioned adjacent to the frame and shackle attachment portion of said first leaf spring component, and further having a half-leaf leaf portion extending substantially along said first cantilever portion;
    an axle seat portion having a first end and a second end;
    the full-leaf leaf portion of said first leaf spring component includes an upper surface and a lower surface, wherein the half-leaf leaf portion of said second leaf spring component includes an upper surface and a lower surface, and wherein in said axle seat portion the upper and lower surfaces for one of said full-leaf leaf portion and said half-leaf leaf portion extend in non-parallel planes; and
    wherein said lower surface for said one of said full-leaf leaf portion and said half-leaf portion tapers continuously through substantially all of said axle seat portion so that said one of said full-leaf leaf portion and said half-leaf leaf portion is thicker at said second end of said axle seat portion than it is at said first end of said axle seat portion.

2. The leaf spring assembly as defined by claim 1 wherein said one of said full-leaf leaf portion and said half-leaf leaf position is said full-leaf leaf portion of said first leaf spring component.

3. A leaf spring assembly for use as an active component in vehicle suspension systems, comprising:
    a first cantilever portion;
    a second cantilever portion adjacent to said first cantilever portion;
    an axle seat portion having a first end in said first cantilever portion and a second end in said second cantilever portion;
    a first leaf spring component having a frame hanger and shackle attachment portion and a full-leaf leaf portion extending substantially along said first and second cantilever portions, said full-leaf leaf portion of said first leaf spring component having an upper surface and a lower surface and being constructed so that said upper surface and said lower surface extend in nonparallel planes through said axle seat portion of said leaf spring assembly;
    a second leaf spring component connected to said first leaf spring component and having a frame hanger and shackle attachment portion positioned adjacent to the frame hanger and shackle attachment portion of said first leaf spring component, and further having a half-leaf leaf portion extending substantially along said first cantilever portion; and
    wherein said lower surface of said full-leaf leaf portion of said first leaf spring component tapers continuously through substantially all of said axle seat portion so that said full-leaf leaf portion of said first leaf spring component is thicker at said second end of said axle seat portion than it is at said first end of said axle seat portion.

4. A leaf spring assembly for use as an active component in vehicle suspension systems, comprising:
    a first cantilever portion;
    a second cantilever portion adjacent to said first cantilever portion;
    a full-leaf leaf spring component extending substantially along said first and second cantilever portions;
    a half-leaf leaf spring component connected to said full-leaf leaf spring component and extending substantially along said first cantilever portion;
    an axle seat portion having a first end and a second end;
    wherein said full-leaf leaf spring component includes an upper surface and a lower surface, wherein said half-leaf leaf spring component includes an upper surface and a lower surface, and wherein in said axle seat portion the upper and lower surfaces for one of said full-leaf leaf spring and said half-leaf leaf spring components extend in nonparallel planes; and
    wherein said lower surface for said one of said full-leaf leaf spring and said half-leaf leaf spring components tapers continuously through substantially all of said axle seat portion so that said one of said full-leaf leaf spring and said half-leaf leaf spring components is thicker at said second end of said axle seat portion than it is at said first end of said axle seat portion.

5. The leaf spring assembly as defined by claim 4 wherein said one of said full-leaf leaf spring and said half-leaf leaf spring components is said full-leaf leaf spring component.

6. A leaf spring assembly for use as an active component in vehicle suspension systems, comprising:
    a first cantilever portion;
    a second cantilever portion adjacent to said first cantilever portion;

an axle seat portion having a first end in said first cantilever portion and a second end in said second cantilever portion;

a full-leaf leaf spring component extending substantially along said first and second cantilever portions, said full-leaf leaf spring having an upper surface and a lower surface and being constructed so that said upper surface and said lower surface extend in nonparallel planes through said axle seat portion of said leaf spring assembly;

a half-leaf leaf spring component connected to said full-leaf leaf spring component and extending substantially along said first cantilever portion;

wherein said lower surface of said full-leaf leaf spring component tapers continuously through substantially all of said axle seat portion so that said full-leaf leaf spring component is thicker at said second end of said axle seat portion than it is at said first end of said axle seat portion.

* * * * *